(12) United States Patent
Lin et al.

(10) Patent No.: US 11,353,756 B1
(45) Date of Patent: Jun. 7, 2022

(54) REFLECTIVE DISPLAY AND CONTROL METHOD THEREOF

(71) Applicant: NATIONAL SUN YAT-SEN UNIVERSITY, Kaohsiung (TW)

(72) Inventors: Tsung-Hsien Lin, Kaohsiung (TW); Heng-Yi Tseng, Kaohsiung (TW); Cheng-Chang Li, Kaohsiung (TW); Li-Min Chang, Kaohsiung (TW); Kuan-Wu Lin, Kaohsiung (TW); Yi-Han Tseng, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 17/329,209

(22) Filed: May 25, 2021

(30) Foreign Application Priority Data

Apr. 1, 2021 (TW) ................................. 110112165

(51) Int. Cl.
*G02F 1/1347* (2006.01)
*G02F 1/137* (2006.01)
*G02F 1/1337* (2006.01)

(52) U.S. Cl.
CPC ...... *G02F 1/13473* (2013.01); *G02F 1/13475* (2013.01); *G02F 1/13756* (2021.01); *G02F 1/133742* (2021.01); *G02F 2203/02* (2013.01); *G02F 2203/055* (2013.01)

(58) Field of Classification Search
None
See application file for complete search history.

(56) References Cited

FOREIGN PATENT DOCUMENTS

JP 2001083551 A * 3/2001
JP 2002207225 A * 7/2002

* cited by examiner

*Primary Examiner* — Phu Vu
(74) *Attorney, Agent, or Firm* — WPAT, PC (57) ABSTRACT

A reflective display apparatus includes three liquid crystal modules stacked in sequence for an incident light to enter from top to bottom sequentially. Each liquid crystal module includes a liquid crystal layer disposed between two substrates. A switchable electric field and a vertical alignment force are provided by the two substrates to the liquid crystal layer. The three liquid crystal modules are respectively: a blue light liquid crystal module located at a top layer, a green light liquid crystal module located in a middle layer and having the liquid crystal layer doped with a dichroic dye for absorbing a light within a blue light wavelength range, and a red light liquid crystal module located at a bottom layer and having the liquid crystal layer doped with a dichroic dye for absorbing a light within a green light wavelength range. A method for controlling the reflective display apparatus is also disclosed.

14 Claims, 5 Drawing Sheets

REFLECTIVE DISPLAY AND CONTROL METHOD THEREOF

CROSS REFERENCE TO RELATED APPLICATION

The application claims the benefit of Taiwan application serial No. 110112165, filed on Apr. 1, 2021, and the entire contents of which are incorporated herein by reference.

BACKGROUND OF THE INVENTION

1. Field of the Invention

The present invention generally relates to an optical imaging technology and, more particularly, to a reflective display apparatus and a method for controlling the reflective display apparatus to improve the color saturation and reduce the color shift of images.

2. Description of the Related Art

Conventional display screens are commonly used in consumer electronic products such as televisions, computers, and mobile phones and generally utilize backlight technology. That is, a backlight source illuminates a liquid crystal display (LCD) panel to provide light required for displaying images. However, another reflective display technology utilizes an LCD panel to reflect ambient light into a viewer's eyes for imaging. The reflective display apparatus does not require a backlight module and can save power. It only needs power to switch the LCD panel for changing images but needs no power for displaying stationary images. As the ambient light gets more sufficient, the images get clearer. Therefore, the reflective display apparatus is suitable for electronic devices without frequently changing images, such as electronic billboards, e-books, etc.

The above-mentioned conventional reflective display apparatus includes laminated multi-layer cholesteric liquid crystal panels, which respectively reflect light of different wavelengths (usually red, green and blue lights) and achieve a full-color display effect by controlling the reflection ratio of each color light. However, the glass between the LCD panels would reflect light of all wavelengths, resulting in reduction of the color saturation of the image. In addition, due to the large-angle reflection of light in the cholesteric liquid crystal layer, the light wavelength would shift toward blue light wavelength, which results in a color shifted image when viewing the display in a large viewing angle. One solution is to add a light-absorbing layer corresponding to the light wavelength between the liquid crystal layers, which can absorb stray light and color shifted light, to increase the image contrast and improve the color shift issue. However, when the device does not display images, each light-absorbing layer would still absorb the incident light of various colors, so that the device is not light-transmittable and cannot be used as a transparent glass.

In light of the above problems, it is necessary to improve the conventional reflective display apparatus.

SUMMARY OF THE INVENTION

To solve the problems mentioned above, an objective of the present invention is to provide a reflective display apparatus, which can be switched between an image display state and a transparent state.

It is another objective of the present invention to provide a reflective display apparatus, which can improve color saturation and maintain display brightness.

It is yet another objective of the present invention to provide a reflective display apparatus, which can reduce the color shifting when viewing in a large viewing angle.

It is a further objective of the present invention to provide a method for controlling a reflective display apparatus, which can switch the states with pulses to save power.

As used herein, the term "a", "an", or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

A reflective display apparatus according to an embodiment includes three liquid crystal modules stacked in sequence for an incident light to enter from top to bottom sequentially. Each of the three liquid crystal modules includes a liquid crystal layer disposed between two substrates. A switchable electric field and a vertical alignment force are provided by the two substrates to the liquid crystal layer. The three liquid crystal modules are respectively a blue light liquid crystal module, a green light liquid crystal module and a red light liquid crystal module. The blue light liquid crystal module is located at a top layer. An incident blue light corresponds to the blue light liquid crystal module, and an incident green light and an incident red light penetrate the blue light liquid crystal module. The green light liquid crystal module is located in a middle layer. The green light liquid crystal module has the liquid crystal layer doped with a dichroic dye for absorbing a light within a blue light wavelength range. The incident green light and a color shifted blue light correspond to the green light liquid crystal module, and the incident red light penetrates the green light liquid crystal module. The red light liquid crystal module is located at a bottom layer. The red light liquid crystal module has the liquid crystal layer doped with a dichroic dye for absorbing a light within a green light wavelength range. The incident red light and a color shifted green light correspond to the red light liquid crystal module.

A reflective display apparatus according to an embodiment includes three liquid crystal modules stacked in sequence for an incident light to enter from top to bottom sequentially. Each of the three liquid crystal modules includes a liquid crystal layer disposed between two substrates. A switchable electric field and a vertical alignment force are provided by the two substrates to the liquid crystal layer. The three liquid crystal modules are respectively a blue light liquid crystal module, a green light liquid crystal module and a red light liquid crystal module. The blue light liquid crystal module is located at a top layer. The blue light liquid crystal module has the liquid crystal layer doped with a dichroic dye for absorbing a light within a blue light wavelength range. An incident blue light and a color shifted blue light correspond to the blue light liquid crystal module, and an incident green light and an incident red light penetrate the blue light liquid crystal module. The green light liquid crystal module is located in a middle layer. The green light liquid crystal module has the liquid crystal layer doped with a dichroic dye for absorbing a light within a green light wavelength range. The incident green light and a color shifted green light correspond to the green light liquid crystal module, and the incident red light penetrates the green light liquid crystal module. The red light liquid crystal module is located at a bottom layer. The incident red light corresponds to the red light liquid crystal module.

A method for switching a reflective display apparatus according to an embodiment includes steps of providing a first switching pulse by two conductive films to the liquid crystal layer of each of the three liquid crystal modules, so that each liquid crystal layer is in a planar state to reflect color light corresponding to each of the three liquid crystal modules, and a dichroic dye absorbs a color shifted blue light; providing a second switching pulse by the two conductive films to the liquid crystal layer of each of the three liquid crystal modules, so that each liquid crystal layer is in a focal conic state to scatter the color light corresponding to each of the three liquid crystal modules, and the dichroic dye absorbs the color shifted blue light; and forming a penetrating electric field to the liquid crystal layer by the two conductive films, so that each liquid crystal layer remains in a transparent state, and the incident light penetrates each of the three liquid crystal modules.

Accordingly, the reflective display apparatus and the method for controlling the reflective display apparatus according to the embodiments can absorb color shifted and stray light through doping a dichroic dye in a liquid crystal layer, so as to improve the color saturation and reduce the color shift of images. In addition, by applying different electric fields to each liquid crystal layer, the reflective display apparatus can switch the light propagation in each liquid crystal layer between reflection, scattering and transmission, achieving the switchable multiple functions such as reflective display, transmittable display and transparent glass.

In an example, each of the three liquid crystal modules is switched to a planar state. The blue light liquid crystal module reflects the incident blue light. The green light liquid crystal module reflects the incident green light and absorbs the color shifted blue light. The red light liquid crystal module reflects the incident red light and absorb the color shifted green light. Thus, each of the three liquid crystal modules can selectively reflect incident color light and absorb other unneeded color light, ensuring the effect of displaying color images.

In an example, each of the three liquid crystal modules is switched to a focal conic state. The blue light liquid crystal module scatters the incident blue light. The green light liquid crystal module scatters the incident green light and absorbs the color shifted blue light. The red light liquid crystal module scatters the incident red light and absorbs the color shifted green light. Thus, each of the three liquid crystal modules can control the unused color light without reflecting display, ensuring the effect of adjusting the color ratio of the image.

In an example, each of the three liquid crystal modules is switched to a planar state. The blue light liquid crystal module reflects the incident blue light and absorbs the color shifted blue light. The green light liquid crystal module reflects the incident green light and absorbs the color shifted green light. The red light liquid crystal module reflects the incident red light. Thus, each of the three liquid crystal modules can selectively reflect incident color light and absorb other unneeded color light, ensuring the effect of displaying color images.

In an example, each of the three liquid crystal modules is switched to a focal conic state. The blue light liquid crystal module scatters the incident blue light and absorbs the color shifted blue light. The green light liquid crystal module scatters the incident green light and absorb the color shifted green light. The red light liquid crystal module scatters the incident red light. Thus, each of the three liquid crystal modules can control the unused color light without reflecting display, ensuring the effect of adjusting the color ratio of the image.

In an example, each of the three liquid crystal modules is switched to a transparent state. The incident red light, incident green light and incident blue light directly penetrate each liquid crystal module. Thus, each of the three liquid crystal modules can be adjusted as bidirectionally transparent, ensuring the effect of using as a transparent glass.

In an example, each of the three liquid crystal modules further includes an alignment film and a conductive film between the liquid crystal layer and each of the two substrates. The alignment film provides an alignment force. The conductive film provides an electric field on the liquid crystal layer. Thus, each of the three liquid crystal modules can control the liquid crystal arrangement of the liquid crystal layer, ensuring the effect of switching between an image display state and a transparent state.

In an example, the reflective display apparatus further includes a bottom plate located under the bottom layer of the three liquid crystal modules. The bottom plate absorbs stray light which penetrates the three liquid crystal modules. Thus, the bottom plate can be used as the background of the reflective display apparatus, ensuring the effect of reducing the image interference by background light.

In an example, the bottom plate is a display. The bottom plate displays an image as the three liquid crystal modules are all in the transparent state. Thus, when the environment is not in favor of light reflection, the bottom plate can display images instead, ensuring the effect of switching between reflective and transmittable displays.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "top", "middle", "bottom", "side" and similar terms are used hereinafter, it should be understood that these terms have reference only to the structure shown in the drawings as it would appear to a person viewing the drawings, and are utilized only to facilitate describing the invention, rather than restricting the invention.

DETAILED DESCRIPTION OF THE INVENTION

Figure 1:
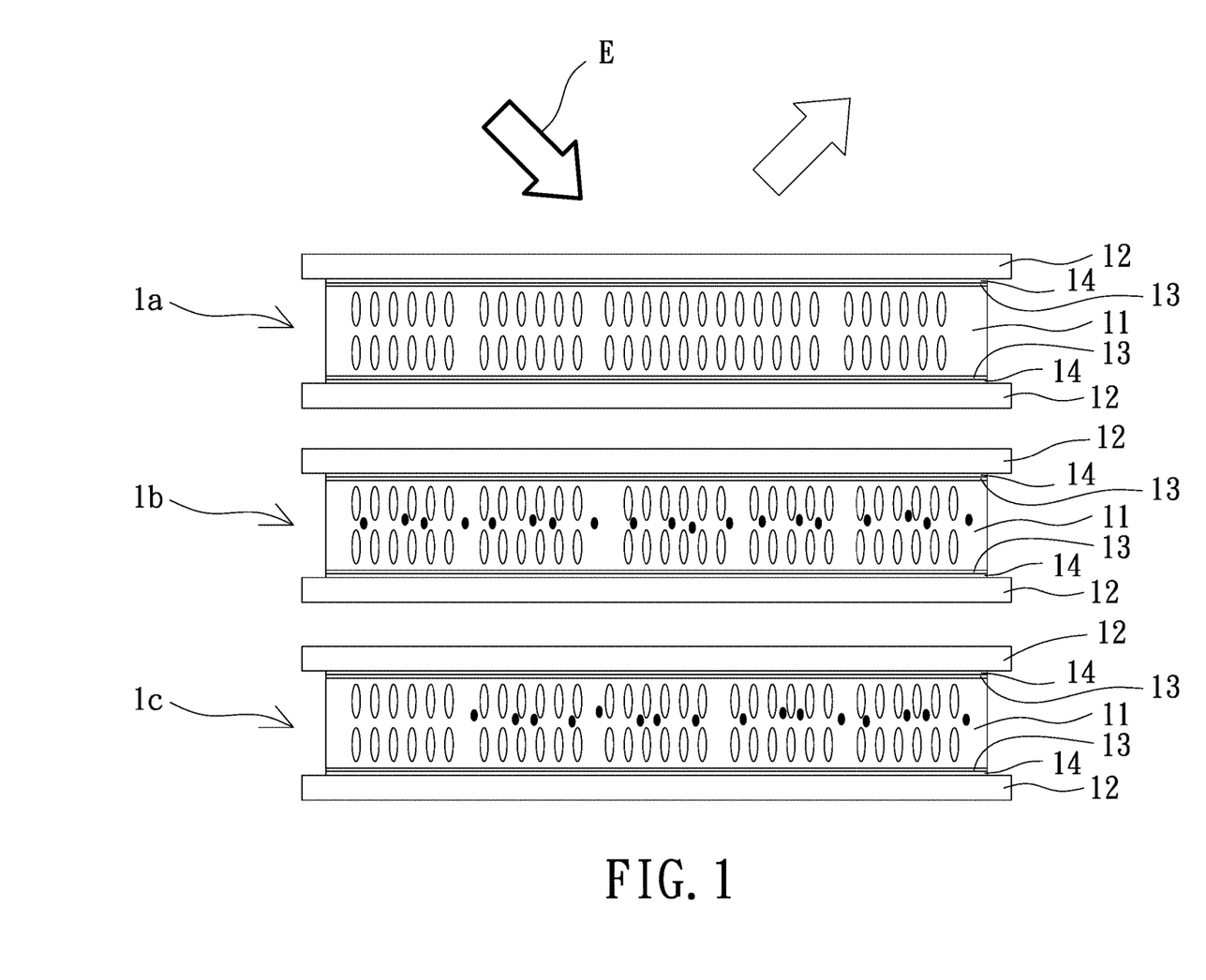
FIG. 1 is a lamination cross-sectional diagram according to a preferred embodiment of the present invention.

Referring to FIG. 1, a reflective display apparatus of a preferred embodiment of the present invention includes three liquid crystal modules 1a, 1b, 1c. The three liquid crystal modules 1a, 1b, 1c include a blue light liquid crystal module 1a, a green light liquid crystal module 1b and a red light liquid crystal module 1c. Each of the liquid crystal modules 1a, 1b, 1c can be switched between a planar state, a focal conic state and a transmission state, so that an incident light E passes through the three liquid crystal modules 1a, 1b, 1c, and reflects, scatters, penetrates or be absorbed in each layer corresponding to the light wavelength.

Each of the liquid crystal modules 1a, 1b, 1c includes a liquid crystal layer 11 disposed between two substrates 12 by injection. The composition of the liquid crystal layer 11 includes cholesteric liquid crystal (ChLC) molecules with bistable characteristics. The liquid crystal layer 11 can keep in one stable state when an electric field is not provided; while the liquid crystal layer 11 can switch to another stable state, such as a planar state and a focal conic state, when a pulsed electric field is provided. In which, the liquid crystal molecules have a periodic spiral arrangement in a planar state, and the spiral axis of the liquid crystal molecules is perpendicular to each substrate 12, so that the incident light E is reflected in the liquid crystal layer 11 according to Bragg's Law. However, the spiral axis of the liquid crystal molecules is randomly arranged in the focal conic state, so that the incident light E is scattered. In addition, when a critical electric field is applied to the liquid crystal layer 11, it breaks down the spiral arrangement structure to align the liquid crystal molecules to be perpendicular to each substrate 12, so that the incident light E penetrates the liquid crystal layer 11 and resulting in a transparent state. The substrate 12 may be a transparent material such as glass, acrylic, or plastic.

Each of the liquid crystal modules 1a, 1b, 1c further includes an alignment film 13 and a conductive film 14 between the liquid crystal layer 11 and each of the two substrates 12. Each alignment film 13 provides an alignment force, and the alignment film 13 is preferably arranged in vertical alignment. Thereby, the liquid crystal molecules are arranged in a twisted arrangement. The alignment film 13 may be a polyimide (PI) film. In addition, the two conductive films 14 provide pulsed electric fields with different intensities and stable electric fields with different intensities to the liquid crystal layer 11, which can change the arrangement of liquid crystal molecules. The conductive films 14 may be transparent thin films made of conductive materials such as indium tin oxide (ITO), silver nanowires, and metal nanoparticles. Alternatively, each of the two conductive films 14 can also be formed in each of the two substrates 12, respectively, as long as the conductive films 14 are capable of providing electric fields.

Figure 2A:
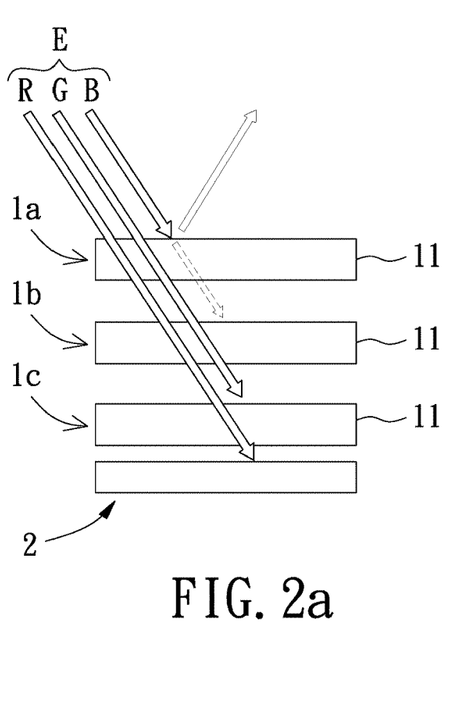
FIG. 2a is a blue light reflection diagram according to the preferred embodiment of the present invention.
Figure 2B:
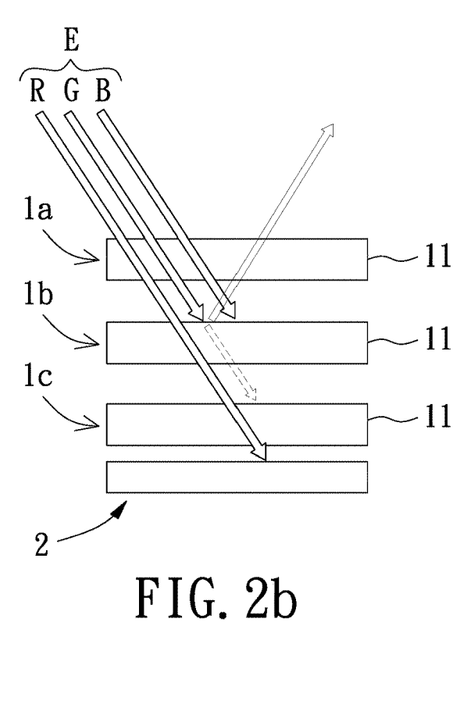
FIG. 2b is a green light reflection diagram according to the preferred embodiment of the present invention.
Figure 2C:
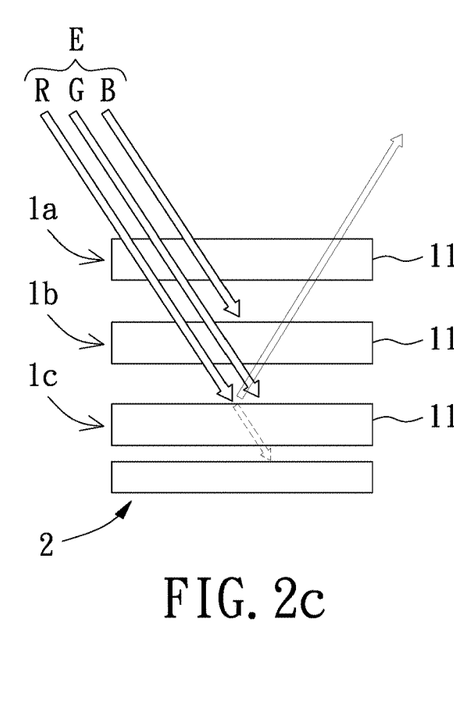
FIG. 2c is a red light reflection diagram according to the preferred embodiment of the present invention.

Referring to FIGS. 2a to 2c, the blue light liquid crystal module 1a is located at the top layer, to be firstly passed through by the incident light E, among the laminated structure. The incident light E within the blue wavelength range (380 nm to 500 nm) corresponds to the liquid crystal layer 11 of the blue light liquid crystal module 1a. As shown in FIG. 2a, when the blue light liquid crystal module 1a is in the planar state, an incident blue light B can be reflected while an incident green light G and an incident red light R can pass through, so as to display blue color to an observer. As shown in FIGS. 2b and 2c, when the blue light liquid crystal module 1a is in the focal conic state, the incident blue light B is scattered and does not display blue color. In addition, the incident blue light B turns into ultraviolet light by the blue color shifted phenomenon. Since it is difficult for human eyes to sense ultraviolet light, the observer hardly perceives color changes.

The green light liquid crystal module 1b is located in the middle layer. After the incident light E passes through the blue light liquid crystal module 1a, the incident green light G and the incident red light R are remained to enter the green light liquid crystal module 1b. The liquid crystal layer 11 of the green light liquid crystal module 1b includes cholesteric liquid crystal and is further doped with a dichroic dye for absorbing the light within blue light wavelength range. The incident light E within the green wavelength range (500 nm to 590 nm) corresponds to the liquid crystal layer 11 of the green light liquid crystal module 1b. As shown in FIG. 2b, when the green light liquid crystal module 1b is in the planar state, an incident green light G can be reflected while an incident red light R can pass through, so as to display green color to the observer. As shown in FIGS. 2a and 2c, when the green light liquid crystal module 1b is in the focal conic state, the incident green light G is scattered and does not display green color. In addition, the incident green light G turns into blue light by the blue color shifted phenomenon to be absorbed by the dichroic dye, ensuring the effects of enhancing color saturation and eliminating stray blue light.

The red light liquid crystal module 1c is located at the bottom layer. After the incident light E passes through the green light liquid crystal module 1b, the incident red light R is remained to enter the red light liquid crystal module 1c. The liquid crystal layer 11 of the red light liquid crystal module 1c includes cholesteric liquid crystal and is further doped with a dichroic dye for absorbing the light within green light wavelength range. The incident light E within the red wavelength range (590 nm to 750 nm) corresponds to the liquid crystal layer 11 of the red light liquid crystal module 1c. As shown in FIG. 2c, when the red light liquid crystal module 1c is in the planar state, the incident red light R can be reflected so as to display red color to the observer. As shown in FIGS. 2a and 2b when the red light liquid crystal module 1c is in the focal conic state, the incident red light R is scattered and does not display red color. In addition, the incident red light R turns into green light by the blue color shifted phenomenon to be absorbed by the dichroic dye, ensuring the effects of enhancing color saturation and eliminating stray green light.

In a reflective display apparatus according to another embodiment of the present invention, the liquid crystal layer 11 of blue light liquid crystal module 1a is doped with a dichroic dye capable of absorbing the light within blue light wavelength range, and the blue light liquid crystal module 1a absorbs the color shifted blue light. The liquid crystal layer 11 of the green light liquid crystal module 1b is doped with a dichroic dye capable of absorbing the light within green light wavelength range, and the green light liquid crystal module 1b absorbs the color shifted green light. The liquid crystal layer 11 of the red light liquid crystal module 1c is not doped with a dichroic dye. In this embodiment, it can also achieve the effects of enhancing color saturation and eliminating stray color light.

By respectively controlling the area and brightness ratio of the lights reflected by the three liquid crystal modules 1a, 1b, 1c, the lights with different colors can be mixed to generate a color image. Further, the color shifted phenomenon can be eliminated by dichroic dyes, and the image can be calibrated to show the correct colors. When the three liquid crystal modules 1a, 1b, 1c are all switched to a transparent state, each liquid crystal layer 11 would not reflect or scatter any light. Thereby, the incident light E including the incident red light R, the incident green light G, and the incident blue light B directly penetrates each layer in the structure, and the light from the background object on the other side can also pass through in a reverse direction. The reflective display apparatus of the present invention can be switched to provide a display function and act as a bidirectional transparent glass.

Figure 3:
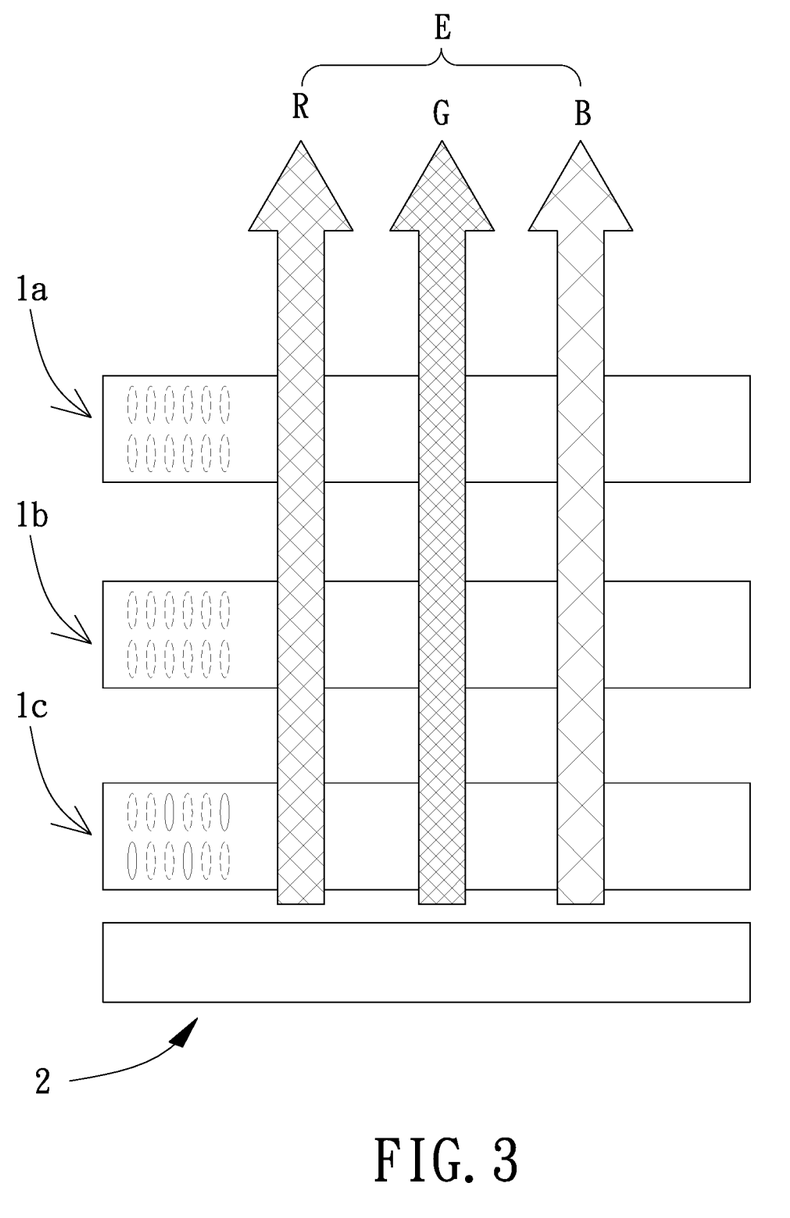
FIG. 3 is a transmittable display diagram according to the preferred embodiment of the present invention.

Referring to FIGS. 2a, 2b, 2c and 3, the reflective display apparatus according to an embodiment further includes a bottom plate 2, which is located under the bottom layer of the three liquid crystal modules 1a, 1b, 1c. The bottom plate 2 may be an absorbing layer for absorbing the stray light penetrating through each liquid crystal layer, making the area where no image (reflected light) is displayed appear black. Thus, the bottom plate 2 is used as the background of the display apparatus. Furthermore, as shown in FIG. 3, the bottom plate 2 may either be a general display. When the three liquid crystal modules 1a, 1b, 1c are all in the transparent state and act as transparent glasses, the bottom plate 2 emits the incident light E to display the color image including the incident red light R, the incident green light G, and the incident blue light B. As such, the reflective display apparatus according to the embodiment may has another transmittable display mode. When the ambient light is sufficient, the reflective display mode with power-saving function is selected; while the ambient light is dim, the reflective display apparatus is switched to the transmittable display mode, using the bottom plate 2 to display images instead.

A method for switching a reflective display apparatus according to an embodiment includes the following steps for switching states. Provide a first switching pulse by two conductive films 14 to each liquid crystal layers 11 of the three liquid crystal modules 1a, 1b, 1c, so that each liquid crystal layer is in the planar state to reflect the color light corresponding to each liquid crystal module, and the dichroic dye absorbs the light within a specific light wavelength range. Provide a second switching pulse by two conductive films 14 to each liquid crystal layers 11 of the three liquid crystal modules 1a, 1b, 1c, so that each liquid crystal layer is in the focal conic state to scatter the color light corresponding to each liquid crystal module, and the dichroic dye absorbs the light within a specific light wavelength range. Form a penetrating electric field to the liquid crystal layer 11 by two conductive films 14, so that the cholesteric liquid crystal (each liquid crystal layers 11) remains in the transparent state, and the incident light E penetrates each of the three liquid crystal modules 1a, 1b, 1c.

Figure 4:
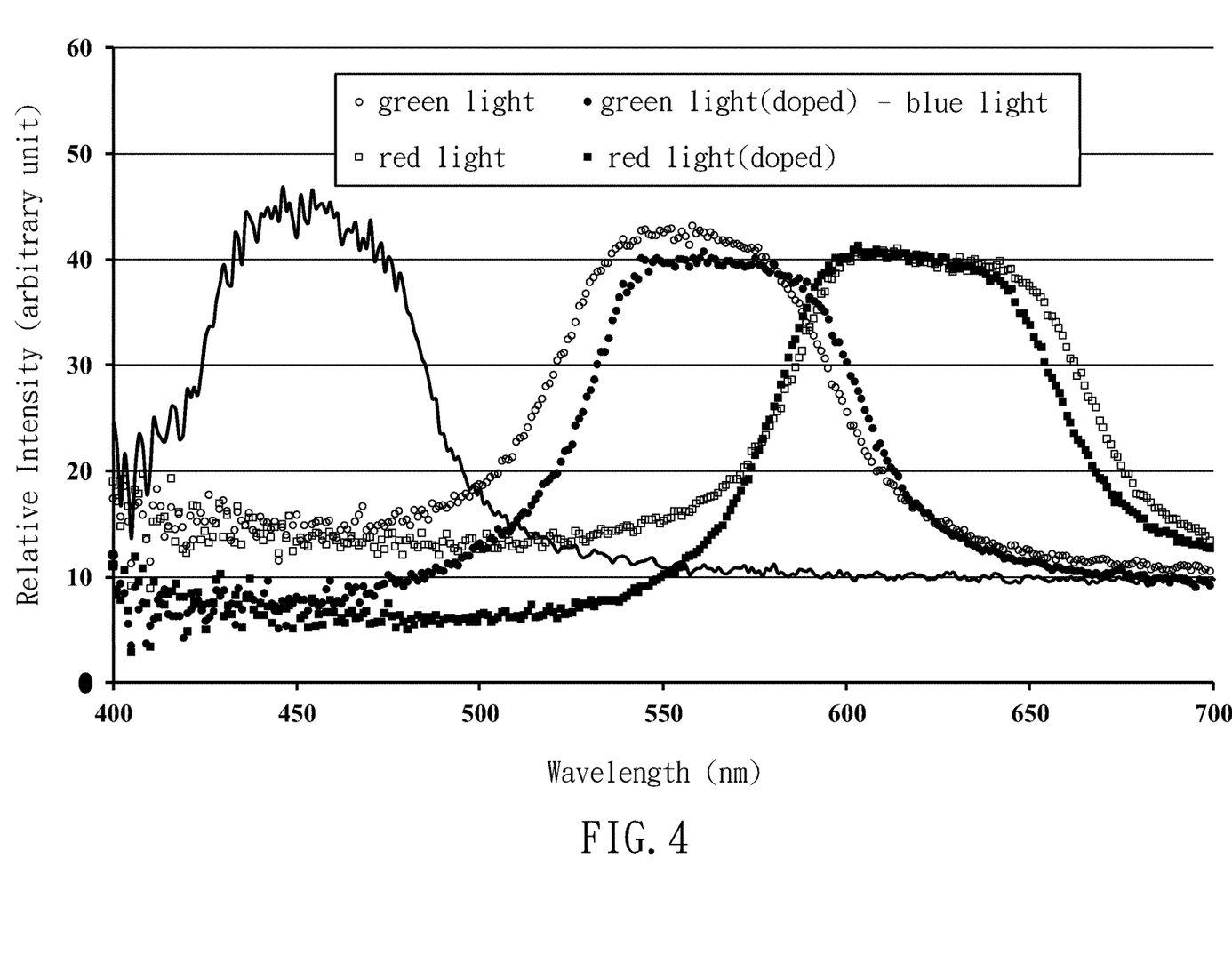
FIG. 4 is a spectrum diagram of the reflected light in three colors according to the preferred embodiment of the present invention.

Referring to FIG. 4, which shows the spectrum diagram of the red, green, and blue lights reflected by a reflective display apparatus according to an embodiment, before and after the reflective display apparatus is doped with a dichroic dye. When the dichroic dye is not doped, the green light shows stray reflected light in the blue wavelength range, and the red light shows stray reflected light in the green and blue wavelength ranges. After doping with the dichroic dye, the blue-shifted stray reflected light is reduced, and the intensity of the main reflected light wavelength range (630 nm for the center wavelength of red light, and 550 nm for the center wavelength of green light) is not weakened. It is seen from the spectrum diagram that the dichroic dye absorbs the stray reflected light out of the main light wavelength range, which can achieve the effect of enhancing the color saturation.

Figure 5A:
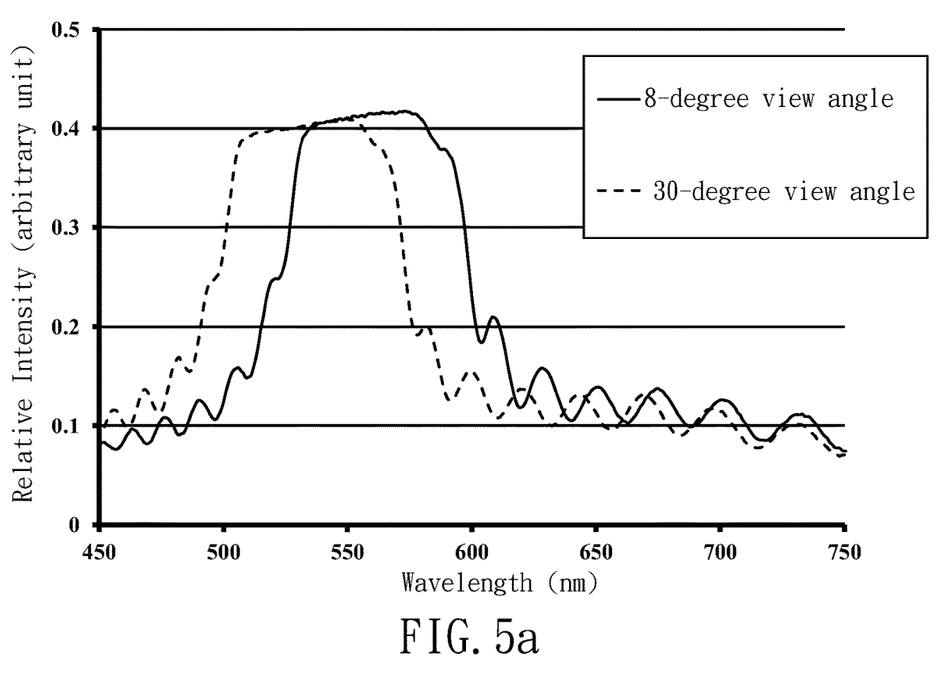
FIG. 5a is a reflection spectrum diagram in a large degree view angle and in a small degree view angle according to a display without dopant.
Figure 5B:
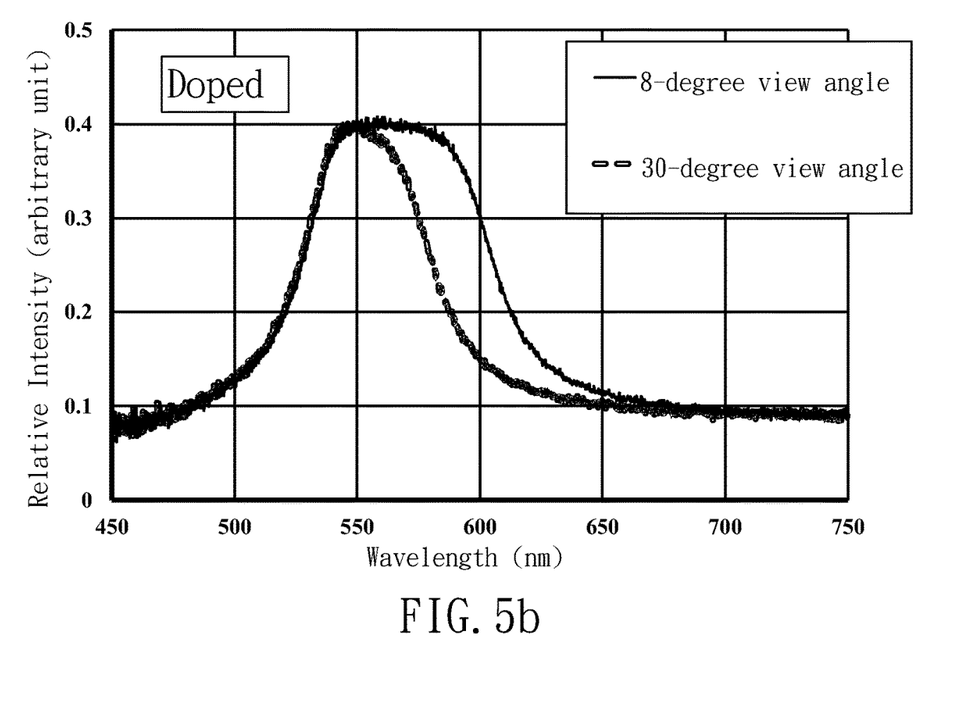
FIG. 5b is a reflection spectrum diagram in a large degree view angle and in a small degree view angle according to the preferred embodiment of the present invention.

Referring to FIGS. 5a and 5b, which shows the spectrum diagram of the green light reflected by the reflective display apparatus according to an embodiment in an 8-degree view angle and in a 30-degree view angle, respectively. As shown in FIG. 5a, when the dichroic dye is not doped, as changing the view angle from 8 degrees to 30 degrees to observe the reflected green light, the spectral distribution shifts to the blue light wavelength (short wavelength) direction by about 25 nm, resulting in serious color shift. In addition, as shown in FIG. 5b, after doping with dichroic dyes, there is no significant change in the spectral distribution of the reflected light observed in an 8-degree view angle, while the spectral distribution of the reflected light observed in a 30-degree view angle becomes narrowed and is close to the observed result in an 8-degree view angle at the central wavelength of 550 nm. The reflected light which originally shifted to the wavelength range of 475 nm-525 nm is absorbed by the dye and weakened, which can improve the color shifted phenomenon in a large degree view angle. Even if the view angle is increased, the same image without color shifted can still be obtained.

In summary, the reflective display apparatus and the method for controlling the reflective display apparatus according to the embodiments can absorb color shifted and stray light through doping a dichroic dye in a liquid crystal layer, so as to improve the color saturation and reduce the color shift of images. In addition, by providing different electric fields to each liquid crystal layer, the reflective display apparatus can switch the light propagation in each liquid crystal layer between reflection, scattering and transmission, achieving the switchable multiple functions such as reflective display, transmittable display and transparent glass.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A reflective display apparatus comprising:
   three liquid crystal modules stacked in sequence for an incident light to enter from top to bottom sequentially, each of the three liquid crystal modules includes a liquid crystal layer disposed between two substrates, wherein a switchable electric field and a vertical alignment force are provided by the two substrates to the liquid crystal layer, and wherein the three liquid crystal modules are respectively:
   a blue light liquid crystal module located at a top layer, wherein an incident blue light corresponds to the blue light liquid crystal module, and an incident green light and an incident red light penetrate the blue light liquid crystal module;
   a green light liquid crystal module located in a middle layer and having the liquid crystal layer doped with a dichroic dye for absorbing a light within a blue light wavelength range, wherein the incident green light and a color shifted blue light correspond to the green light liquid crystal module, and the incident red light penetrates the green light liquid crystal module; and
   a red light liquid crystal module located at a bottom layer and having the liquid crystal layer doped with a dichroic dye for absorbing a light within a green light wavelength range, wherein the incident red light and a color shifted green light correspond to the red light liquid crystal module.

2. The reflective display apparatus as claimed in claim 1, wherein each of the three liquid crystal modules is switched to a planar state, the blue light liquid crystal module is configured to reflect the incident blue light, the green light liquid crystal module is configured to reflect the incident green light and absorb the color shifted blue light, and the red light liquid crystal module is configured to reflect the incident red light and absorb the color shifted green light.

3. The reflective display apparatus as claimed in claim 1, wherein each of the three liquid crystal modules is switched to a focal conic state, the blue light liquid crystal module is configured to scatter the incident blue light, the green light liquid crystal module is configured to scatter the incident green light and absorb the color shifted blue light, and the red light liquid crystal module is configured to scatter the incident red light and absorb the color shifted green light.

4. A reflective display apparatus comprising:
three liquid crystal modules stacked in sequence for an incident light to enter from top to bottom sequentially, each of the three liquid crystal modules includes a liquid crystal layer disposed between two substrates, wherein a switchable electric field and a vertical alignment force are provided by the two substrates to the liquid crystal layer, wherein each of the three liquid crystal modules is switched to a focal conic state, and wherein the three liquid crystal modules are respectively:
a blue light liquid crystal module located at a top layer and having the liquid crystal layer doped with a dichroic dye for absorbing a light within a blue light wavelength range, wherein the blue light liquid crystal module is configured to scatter an incident blue light and absorb a color shifted blue light, and an incident green light and an incident red light penetrate the blue light liquid crystal module;
a green light liquid crystal module located in a middle layer and having the liquid crystal layer doped with a dichroic dye for absorbing a light within a green light wavelength range, wherein the green light liquid crystal module is configured to scatter the incident green light and absorb a color shifted green light, and the incident red light penetrates the green light liquid crystal module; and
a red light liquid crystal module located at a bottom layer, wherein the red light liquid crystal module is configured to scatter the incident red light.

5. The reflective display apparatus as claimed in claim 1, wherein each of the three liquid crystal modules is switched to a transparent state, and the incident red light, the incident green light and the incident blue light directly penetrate each of the three liquid crystal modules.

6. The reflective display apparatus as claimed in claim 4, wherein each of the three liquid crystal modules is switched to a transparent state, and the incident red light, the incident green light and the incident blue light directly penetrate each of the three liquid crystal modules.

7. The reflective display apparatus as claimed in claim 1, wherein each of the three liquid crystal modules further includes an alignment film and a conductive film between the liquid crystal layer and each of the two substrates, wherein the alignment film is configured to provide an alignment force, and the conductive film is configured to provide an electric field on the liquid crystal layer.

8. The reflective display apparatus as claimed in claim 4, wherein each of the three liquid crystal modules further includes an alignment film and a conductive film between the liquid crystal layer and each of the two substrates, wherein the alignment film is configured to provide an alignment force, and the conductive film is configured to provide an electric field on the liquid crystal layer.

9. The reflective display apparatus as claimed in claim 1, further comprising a bottom plate located under the bottom layer of the three liquid crystal modules, and the bottom plate is configured to absorb a stray light which penetrates the three liquid crystal modules.

10. The reflective display apparatus as claimed in claim 4, further comprising a bottom plate located under the bottom layer of the three liquid crystal modules, and the bottom plate is configured to absorb a stray light which penetrates the three liquid crystal modules.

11. The reflective display apparatus as claimed in claim 9, wherein the bottom plate is a display and configured to display an image as the three liquid crystal modules are all in the transparent state.

12. The reflective display apparatus as claimed in claim 10, wherein the bottom plate is a display and configured to display an image as the three liquid crystal modules are all in the transparent state.

13. A method for controlling a reflective display apparatus, adapted to control the reflective display apparatus as claimed in claim 1, the method comprises:
providing a first switching pulse by two conductive films to the liquid crystal layer of each of the three liquid crystal modules, so that each the liquid crystal layer is in a planar state to reflect color light corresponding to each of the three liquid crystal modules, and a dichroic dye absorbs a color shifted blue light;
providing a second switching pulse by the two conductive films to the liquid crystal layer of each of the three liquid crystal modules, so that each the liquid crystal layer is in a focal conic state to scatter the color light corresponding to each of the three liquid crystal modules, and the dichroic dye absorbs the color shifted blue light; and
forming a penetrating electric field to the liquid crystal layer by the two conductive films, so that each the liquid crystal layer remains in a transparent state, and the incident light penetrates each of the three liquid crystal modules.

14. A method for controlling a reflective display apparatus, adapted to control the reflective display apparatus as claimed in claim 4, the method comprises:
providing a first switching pulse by two conductive films to the liquid crystal layer of each of the three liquid crystal modules, so that each the liquid crystal layer is in a planar state to reflect color light corresponding to each of the three liquid crystal modules, and a dichroic dye absorbs a color shifted blue light;
providing a second switching pulse by the two conductive films to the liquid crystal layer of each of the three liquid crystal modules, so that each the liquid crystal layer is in a focal conic state to scatter the color light corresponding to each of the three liquid crystal modules, and the dichroic dye absorbs the color shifted blue light; and
forming a penetrating electric field to the liquid crystal layer by the two conductive films, so that each the liquid crystal layer remains in a transparent state, and the incident light penetrates each of the three liquid crystal modules.

* * * * *